United States Patent [19]

Bergounhon

[11] Patent Number: 5,013,237

[45] Date of Patent: May 7, 1991

[54] OVEN FOR DEHYDRATING PULVERULENTS, SAND OR GRANULES

[76] Inventor: René Bergounhon, Alpha Platre, 18 Rue Pierre-Grange, 94120 Fontenay-Sous-Bois, France

[21] Appl. No.: 347,897

[22] PCT Filed: Feb. 29, 1988

[86] PCT No.: PCT/FR88/00111

§ 371 Date: Jan. 6, 1989

§ 102(e) Date: Jan. 6, 1989

[87] PCT Pub. No.: WO88/07163

PCT Pub. Date: Sep. 22, 1988

[30] Foreign Application Priority Data

Mar. 16, 1987 [FR] France .................. 87 03528

[51] Int. Cl.$^5$ .................. F27D 1/08; F26B 17/12
[52] U.S. Cl. .................. 432/100; 432/96; 432/58; 34/171
[58] Field of Search .......... 34/168, 170, 171; 432/15, 58, 96, 100, 101, 102, 129, 130, 131, 132, 133, 159, 161, 186, 194, 242

[56] References Cited

U.S. PATENT DOCUMENTS

| | | | |
|---|---|---|---|
| 2,361,151 | 10/1944 | Reed | 34/171 |
| 2,647,738 | 8/1953 | Trainer | 432/58 |
| 2,821,375 | 1/1958 | Andrews | 432/58 X |
| 3,330,046 | 7/1967 | Albertus | 432/100 X |
| 3,371,429 | 3/1968 | Miller et al. | 34/171 |
| 4,114,289 | 9/1978 | Boulet | 34/168 X |
| 4,188,184 | 2/1980 | Fornoni | 432/58 |

FOREIGN PATENT DOCUMENTS

| | | |
|---|---|---|
| 156380 | 5/1954 | Australia . |
| 712139 | 10/1941 | Fed. Rep. of Germany ........ 34/168 |
| 3145549 | 6/1983 | Fed. Rep. of Germany . |

*Primary Examiner*—Henry A. Bennet
*Assistant Examiner*—C. Kilner
*Attorney, Agent, or Firm*—Lalos & Keegan

[57] ABSTRACT

Oven for dehydrating pulverulents, sand or granules, comprising an energy-saving dehydration device, adapted to gypsum burning. The device consists of an outer casing, an inner casing and flow cones disposed on said casings. A burner and a lock complete the device. Pressure within the oven is increased by the provision of a cover, a gypsum lock and a steam valve. The process takes place in dry or moist conditions, the latter being advantageous for the processing of insulating products or for gypsum amending the nature of plaster. Heat exchange enables the products to be processed at low temperatures. The central combustion chamber prevents loss by radiation. Application to gypsum burning, during which the device has demonstrated energy savings of 50% in comparison with traditional appliances.

9 Claims, 1 Drawing Sheet

OVEN FOR DEHYDRATING PULVERULENTS, SAND OR GRANULES

This invention relates to apparatus for drying particulate materials such as sand, aggregates, powdered products and the like and which is particularly economical in energy consumption.

The wet or dry calcining of gypsum crushed to fine and granular form is illustrative of drying processes for particulate materials, this example being of particular interest due to the poor heat conductivity of gypsum. Thus, when gypsum is dried at a pressure close to or less than $10^5$ Pascals (1 bar), water in the gypsum is eliminated as dry steam and a microporous solid product is obtained which consists of a loose assembly of microcrystallites, which is called $\beta$-type plaster.

If gypsum is dried at a pressure exceeding $10^5$ Pascals in a liquid environment, a crystalline solid of hexagonal appearance is obtained which is $\alpha$-type plaster. The latter has more desirable properties in subsequent use than the $\beta$ variety, because it requires a far smaller amount of mixing water. However, the manufacturing processes by which it is produced are quite costly due to the high level of energy consumption and the material facilities required.

Indeed, this variety of plaster is generally produced in high-temperature autoclaves wherein the internal pressure is raised from 5 to $7 \times 10^5$ Pascals. For this reason, the $\alpha$ variety is generally produced in only small quantities compared with the $\beta$ variety and is kept for just a few special applications where very high mechanical characteristics are required of the plaster.

In reality, $\alpha$ and $\beta$ varieties are only extreme terms in a series of intermediate varieties exhibiting more or less marked states of crystallisation. These varieties which include what are termed low-pressure varieties, exhibit mechanical strength properties which are vastly superior to those of the $\beta$ variety.

In industry, most plaster is used in mixture with $\beta$ plaster to enrich this latter so that it has intermediate characteristics identical to those of the low-pressure $\alpha$ varieties.

Conventionally, gypsum is dried in rotary ovens or in static cauldrons fitted with interior mechanical mixers or in any other system capable of producing heat and of transmitting it to the gypsum in order to evaporate the water of hydration therefrom; the increase in the temperature of the gypsum can occur in a dry or in a wet environment. The heat is produced by generators using industrial fuels and the temperature of the gypsum is raised either by direct contact with the combustion gases or by indirect contact through gaseous, liquid, refractory, metal or other heat exchangers. In ovens of this type, heat exchange between the products to be treated, the heated gases or the heated walls is carried out by agitation of the products and by their repeated passing through heated zones. In other processes, the product to be treated is substantially static, the heat exchange being carried out by multiple passages of recycled heated gases in such a way as to recover the maximum heat energy before the gases are discharged. All these prior art ovens for producing $\beta$ semi-hydrate or dead-burnt product work at atmospheric pressure in a dry atmosphere.

For example, in the case of the Renaudin oven which is the subject of French Patent No. 979,494, the inlets and outlets are open to atmospheric pressure and drying is performed in a dry atmosphere, the product, almost at the point of flow, is stationary in relation to non-recycled hot gas. However, such apparatus does not permit effective heat exchange, especially since special care is required to eliminate the water vapour produced in order to avoid the gypsum boiling in its organic water, the inventor finding this procedure preferable.

Another system described in German Patent No. 31 45 549 for calcining gypsum in the form of blocks likewise discloses a method in which the product to be treated is substantially immobile and virtually on the point of flow. This is likewise a system which is open to dry atmospheric pressure and which can only process blocks, the bottom part of the oven working on the countercurrent principle, the heated gases not being able to pass through the fine elements without causing a blockage. Blocks do not permit of suitable heat exchange and recycling of the gases is vital and seems to be the subject of considerable study.

Another hitherto proposed system involves drying the gypsum while it is being pneumatically conveyed from an intake point to a discharge point from an oven. In this case, the treated product is reduced to fine particles and is moved at the velocity of the hot gas. The heat exchange time is around 1 second. The heated gases are necessarily recycled and unless there is a very long calcining cycle, the product also has to be recycled. The product and the gas are separated when the process is finished. All the treatment is carried out under dry atmospheric pressure. One form of this system is described in U.S. Pat. No. 4,101,630 in which a long calcining duct comprises an assembly of two concentric tubes connected by a helical wall. This arrangement is not very bulky but offers the risk of material being deposited on the helical wall during transport. Normally, apparatus of this type is arranged vertically.

The flow of plaster in these various hitherto proposed ovens may be sequential or continuous.

Due to the difficulties encountered in transmitting heat to the gypsum, the temperatures used are substantially above the theoretical conversion temperature and whereas, in theory, 140 calories are necessary to convert 1 kg of gypsum to the semihydrate form, the above mentioned appliances use for practical purposes 300 to 400 calories (not including the energy needed for the mixing mechanisms, and for the removal of dust and dirt from the whole system). Energy losses result from the high temperatures of the plaster formed leaving the apparatus, the combustion gases leaving the apparatus, the considerable mass of air passing through the ovens to evacuate the water vapour, the radiation towards the outside environment, and heatproofing is not always being feasible We have now found it possible to avoid the above drawbacks by utilizing a static vertical oven. Furthermore, we have found it possible to produce semihydrate of gypsum ranging from the $\beta$ variety to the advanced crystallisation forms of low-pressure $\alpha$ semihydrate by simply adjusting the treatment pressure under particularly advantageous energy consumption conditions.

Thus, in accordance with the present invention, there is provided a continuous flow static vertical oven for drying under pressure granular or powder products in a wet or dry environment, comprising a thermally insulated outer jacket including a bottom wall, a top inlet in said thermally insulated outer jacket, products to be treated being conveyed through the top inlet into the thermally insulated outer jacket and drawn off after treatment through an orifice provided in the bottom wall of the outer jacket, a concentric inner jacket forming a combustion chamber, an upper part of which houses a burner, and further comprising, in a space between the two jackets a first series of frustoconical walls connected at their top edge to the outer jacket at different levels while their bottom edges define with the inner jacket first narrow annular passages, and a second series of frustoconical walls alternating with those of the first series, connected at their top edge to the inner jacket and of which the bottom edges define with the outer jacket second narrow annular passages, means to permit passage of gas counter-current to the flow of product to be treated through the space between the jackets and over the entire height of the oven comprising a gap between the lower end of the inner jacket and the bottom wall of the outer jacket, outlet seal means for the said orifice, and wherein the said frustoconical walls define with the inner and outer jackets mixing chambers and whereby the counter-current passage of the gas fluidizes the product to be treated in each mixing chamber. Embodiments of the invention are hereinafter described by way of non-limiting example with reference to the accompanying drawings in which:

FIG. 1 schematically shows a cross-section of an oven in accordance with the invention;

Figure 1:
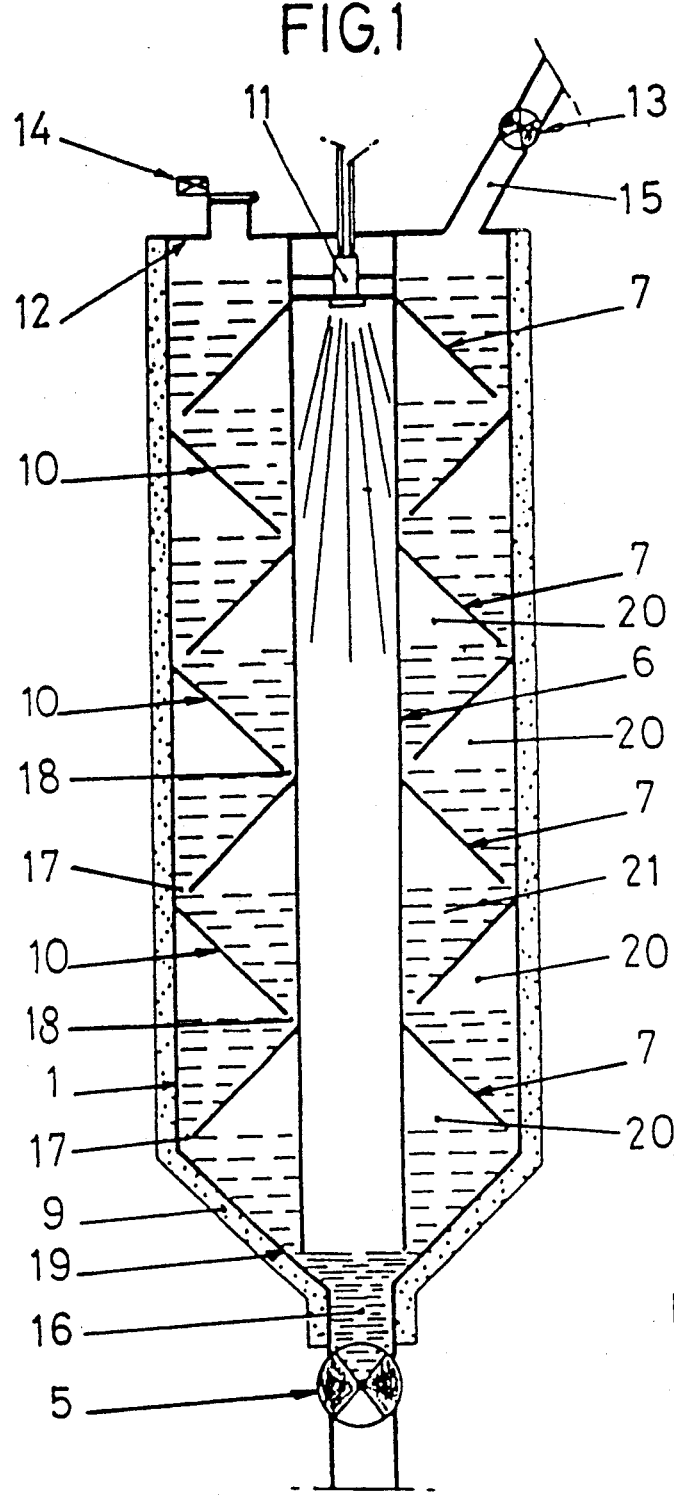

The oven shown in the accompanying drawing comprises an outer heatproof jacket (1) of, for example, cylindrical shape, protected by an insulating material (9) and a concentric inner jacket (6) forming a combustion chamber. Housed in the upper part of this combustion chamber (6) is a burner (11) to which fuel and combustion air are fed under a pressure which is greater than the pressure inside the oven. The burner is operated with an automatic ignition device. In the space between jackets (1) and (6) there is a first series of frustoconical walls (10) connected at their top edges to the outer jacket (1) at various levels. The bottom edges of the walls (10) define with the inner jacket (6) a series of narrow annular passages (18). A second series of frustoconical walls (7) interposed between those of the first series, connected by their top edges to the inner jacket (6) define between their bottom edges and the outer jacket (1) second narrow annular passages (17). The inner jacket (6) finishes at its bottom edge at a small distance from narrow annular passage.

Figure 2:
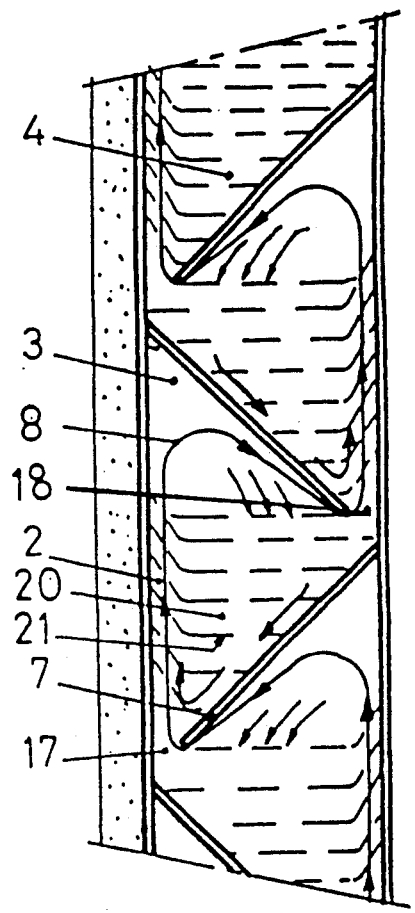
FIG. 2 illustrates in detail flow of material in the oven of FIG. 1.

All in all, cylindrical walls (1) and (6) and frustoconical walls (7) and (1) define mixing chambers or lock chambers (20). The conical dimensions of the walls (7) and (10) are determined to allow gravity flow of the product to be treated until it successively fills the bottom mixing chambers (20) to the point of filling the annular passages (17) and (18). Combustion gas escaping through the bottom of the inner jacket (6) and rising through the lock chambers (20) fluidises and transports the product to be treated into the zone (2) of each chamber (20) establishing a horizontal level at the height of the corresponding upper narrow annular passage (17) and (18), this rigorously establishing the volume of filling of the oven and allowing clear expansion spaces (3). Continuous assessment of the weight of the whole oven with product to be treated makes it possible to monitor the fact that during operation the product fed in through the upper inlet (15) constantly makes up for the treated product which is extracted through the orifice (16). FIG. 2 shows in detail the movements which occur inside one mixing chamber (20).

The combustion gases pass through the mass of product to be treated in the zone (2) of least pressure drop over a width defined by the width of the corresponding lower annular orifice (17), determined so that the density of the flow of combustion gases in this zone (2) gives rise to pneumatic transport of the product from the zone (2) into the expansion space (3), this expansion producing separation of the substance and depositing it on the upper surface of the product contained in the chamber in question, the combustion gases continuing on their way as indicated by the arrow. At the same time, product (21) flows over the frustoconical walls (7) and (10) fills up the zone (2), passing towards the annular passage (17). There is therefore imparted to the product an annular movement of rotation within the chamber in question, the said rotary movement taking place in the opposite direction in the next upper chamber until the combustion gases (8) are discharged through the top outlet (14).

The residence time of material in the oven may be, for example, up to 40 minutes and during this time the product may pass along a route amounting to several kilometres. All the heat energy in the combustion gases is exhausted, automatic control means ensuring maintenance of their temperature at a level slightly above the dew point. The extreme saturation of the combustion gases with water vapour may be such that 1000g of water are extracted per $m^3$ of combustion gas introduced into the burner.

As the new material introduced through the inlet (15) is generally cold, it may cause condensation of a part of this water. Thus, above a certain height in the oven the temperature of the gypsum increases as it passes through a humid zone, and then drying can take place in a subsequent part of the oven under pressure due to the pressure drop caused as the gases pass through the product contained in the first part of the oven. This pressure may be increased in order to enhance crystallisation to the $\alpha$ semi-hydrate form by regulating the valve (14) mounted on the combustion gas and water vapour outlet orifice. A flow control system can be mounted on the outlet orifice (16) and may, for example, be a rotary seal (5) or an Archimedean screw.

Fluidtightness of the system is guaranteed by the product itself which, compressed by the pressure inside the oven, forms a plug in the orifice (16).

When the treated product is flowing continuously, this plug is being constantly regenerated by the supply of product from the upper mixing chamber through the annular space formed by the bottom (19) and the bottom of the inner jacket (16). This flow of product will be passed on from chamber to chamber (20) continuously through annular orifices (17) and (18) over the entire height of the oven, while maintaining the horizontal level of the product flush with the annular orifices (17) and (18). Continuous assessment of the weight of the oven and its contents makes it possible to ensure maintenance of the constant level by controlling the introduction of product to be treated through the inlet (15), by means of a rotary seal (13).

It will therefore be noted that a small part of the product to be treated, turning over in each chamber (20), does not return to the zone (2) of pneumatic transport by flowing over the frustoconical walls but passes through the annular orifices (17) and (18) once the level in the next lower chamber starts to drop, in order to restore the level. The number of chambers (20) needed for the system to operate satisfactorily will be chosen according to the annular orifices (17) and (18), allowing a maximum difference in density so that the products situated towards the top of the oven and which are heavier than the products towards the bottom do not drop through the said orifices (17) and (18), there being no need to maintain the level in the lower chamber.

Figure 3:
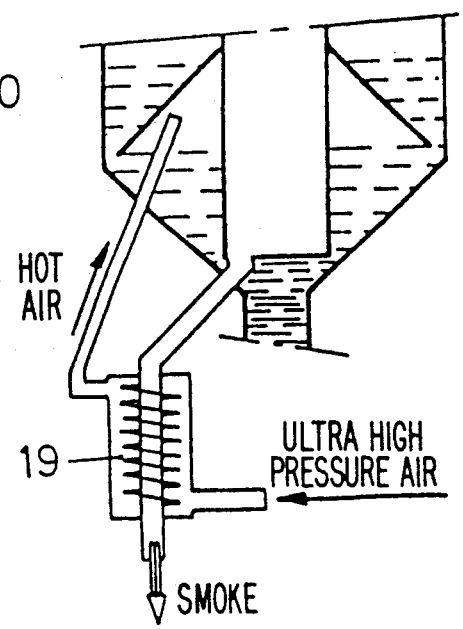
FIG. 3 shows a part of a modification to the oven of FIG. 1 in accordance with the invention.

The gas which passes under pressure through the product from the bottom upwards may not necessarily be the same as the combustion gases (see e.g. FIG. 3 where indirect heating of the treating gas occurs). In this case, the combustion gases are passed through a heat exchanger (19) which heats air which is at elevated pressure and which is intended to pass through the product, so avoiding the product being polluted by the combustion gases and also avoiding combustion at a very high pressure in the case of the process having to be performed at high pressure.

The means to connect passage of the combustion gas to the flow of material to be treated may include the supply of a transport gas, such as ultra high pressure air, heated in a heat exchanger, in order to avoid high pressure combustion and possible pollution by combustion products of the material which is to be treated.

The extent of heat exchange shows that gypsum passing through this oven in 40 minutes could be treated at 120° C. in order to produce low pressure $\alpha$ or $\beta$ semi-hydrate. This low temperature is due to the improvement in the conductivity of the heated gypsum in a humid atmosphere in the upper part of the oven and maintained above the conversion temperature for a major part of the cycle.

Tests which we have conducted in a system where the combustion gases passing directly upwards through the gypsum from the bottom of the combustion chamber (6) have revealed consumption levels of 150 calories per kilogram of gypsum treated without any consumption of energy other than that needed to operate the burner.

This result, which is very close to the theory, is obtained by virtue of the fact that the only energy which does not escape from the oven is contained in the plaster at 120° C. existing at the bottom outlet and in the water vapour and the combustion gases at 95° C. which escape at the top. As these combustion gases are in the minimum quantity needed, the concentration of water is about 1 kg per $m^3$ of gas introduced into the burner.

It will be readily conceived that by raising the pressure in the oven to about $2 \times 10^5$ Pascals, it is possible to bring the gypsum to its conversion point in a humid phase and so produce semi-hydrate in a continuous cycle.

I claim:

1. A continuous flow static vertical oven for drying under pressure granular or powder products in a wet or dry environment, comprising a thermally insulated outer jacket including a bottom wall, a top inlet in said thermally insulated outer jacket, products to be treated being conveyed through the top inlet into the thermally insulated outer jacket and drawn off after treatment through an orifice provided in the bottom wall of the outer jacket, a concentric inner jacket forming a combustion chamber, an upper part of which houses a burner, and further comprising, in a space between the two jackets, a first series of frustoconical walls connected at their top edge to the outer jacket at different levels while their bottom edges define with the inner jacket first narrow annular passages, and a second series of frustoconical walls alternating with those of the first series, connected at their top edge to the inner jacket and of which the bottom edges define with the outer jacket second narrow annular passages, means to permit passage of gas counter-current to the flow of product to be treated through the space between the jackets and over the entire height of the oven comprising a gap between the lower end of the inner jacket and the bottom wall of the outer jacket, outlet seal means for the said orifice, and wherein the said frustoconical walls define with the inner and outer jackets mixing chambers and the gas fluidizes the product to be treated in each mixing chamber.

2. An oven according to claim 1 for the treatment of gypsum and including a fluid-tight cover having a discharge valve and a product inlet valve, making it possible to obtain sufficient pressure to ensure processing of the gypsum in a humid atmosphere at 120° C. to produce $\alpha$-semi-hydrate in a continuous process cycle.

3. An oven according to claim 1 wherein the means to permit passage of gas counter-current to the flow of material to be treated includes a supply of transport gas, heated in a heat exchanger, in order to avoid high pressure combustion and possible pollution by combustion products of the material which is to be treated.

4. An oven according to claim 3 wherein the transport gas is ultra high pressure air.

5. An oven according to claim 1 wherein the gas escaping through the bottom of the inner jacket and rising through the mixing chamber entrains water vapor contained in the product during the course of processing, humidifying newly introduced cold products and thereby enhancing their thermal conductivity.

6. An oven according to claim 1 wherein an outlet seal is provided which makes it possible to achieve a constant regulated flow from the oven while maintaining the interior pressure without leakages with a plug of treated product compressed by the internal pressure and accumulated between the seal and the bottom of the inner jacket, the said plug preserving fluid-tightness by it being continuously regenerated by the supply of product contained in the top chamber when treated product is withdrawn through the seal.

7. An oven according to claim 1 wherein in each mixing chamber the product to be treated accumulates substantially to the level of the bottom edge of an upper frustoconical wall of the chamber, allowing free expansion spaces, and wherein gas passing through each chamber ensures pneumatic conveyance of product into a zone parallel with the walls of the inner and outer jackets and then the surface contacting the expansion spaces, the space left by the conveyed product being at the same time filled by a flow of product from a lower frustoconical wall of the chamber towards the annular passages and thus into the zone of pneumatic conveyance, the cross-section of the said annular passages being so chosen as to allow such conveyance and allow simultaneous flow of product to the next lower chamber, the level of product dropping as a result of withdrawal of the said product through the orifice.

8. A process for the preparation of plaster which comprises treating gypsum in an oven in accordance with claim 1.

9. Plaster produced by treating gypsum in an oven in accordance with claim 8.

* * * * *